United States Patent
Whitton et al.

(10) Patent No.: US 6,915,890 B1
(45) Date of Patent: Jul. 12, 2005

(54) LEARNING METHOD FOR ONCOMING CLUTCH FILL LEVEL AND VOLUME

(75) Inventors: Matthew D. Whitton, Howell, MI (US); Steven P. Moorman, Dexter, MI (US); Joel H. Gunderson, Westland, MI (US)

(73) Assignee: General Motors Corporation, Detroit, MI (US)

( * ) Notice: Subject to any disclaimer, the term of this patent is extended or adjusted under 35 U.S.C. 154(b) by 13 days.

(21) Appl. No.: 10/739,790

(22) Filed: Dec. 18, 2003

(51) Int. Cl.[7] .......................................... F16D 48/06
(52) U.S. Cl. ........................ 192/85 R; 192/109 F; 477/86; 477/155; 701/59; 701/68
(58) Field of Search ............... 192/85 R, 109 F; 701/59, 68, 58, 51; 477/155, 156, 62, 86, 477/180

(56) References Cited

U.S. PATENT DOCUMENTS

| | | | |
|---|---|---|---|
| 5,079,970 A | * | 1/1992 | Butts et al. ............. 192/109 F |
| 5,119,695 A | * | 6/1992 | Milunas et al. ............. 477/155 |
| 6,292,732 B1 | * | 9/2001 | Steinmetz et al. ....... 192/109 F |

* cited by examiner

*Primary Examiner*—Rodney H. Bonck
(74) *Attorney, Agent, or Firm*—Christopher DeVries

(57) ABSTRACT

A method for adaptively learning clutch volumes and fill level to compensate for build tolerances and clutch wear includes increasing a fill level of a clutch during an oncoming fill phase of a clutch to clutch transmission. A state of a regulator valve of the clutch to clutch transmission is monitored during the oncoming fill phase. Fill level of the clutch is adjusted before a next shift based on whether the regulator valve switches from a regulating state to a full feed state before elapse of a valid shift time.

20 Claims, 10 Drawing Sheets

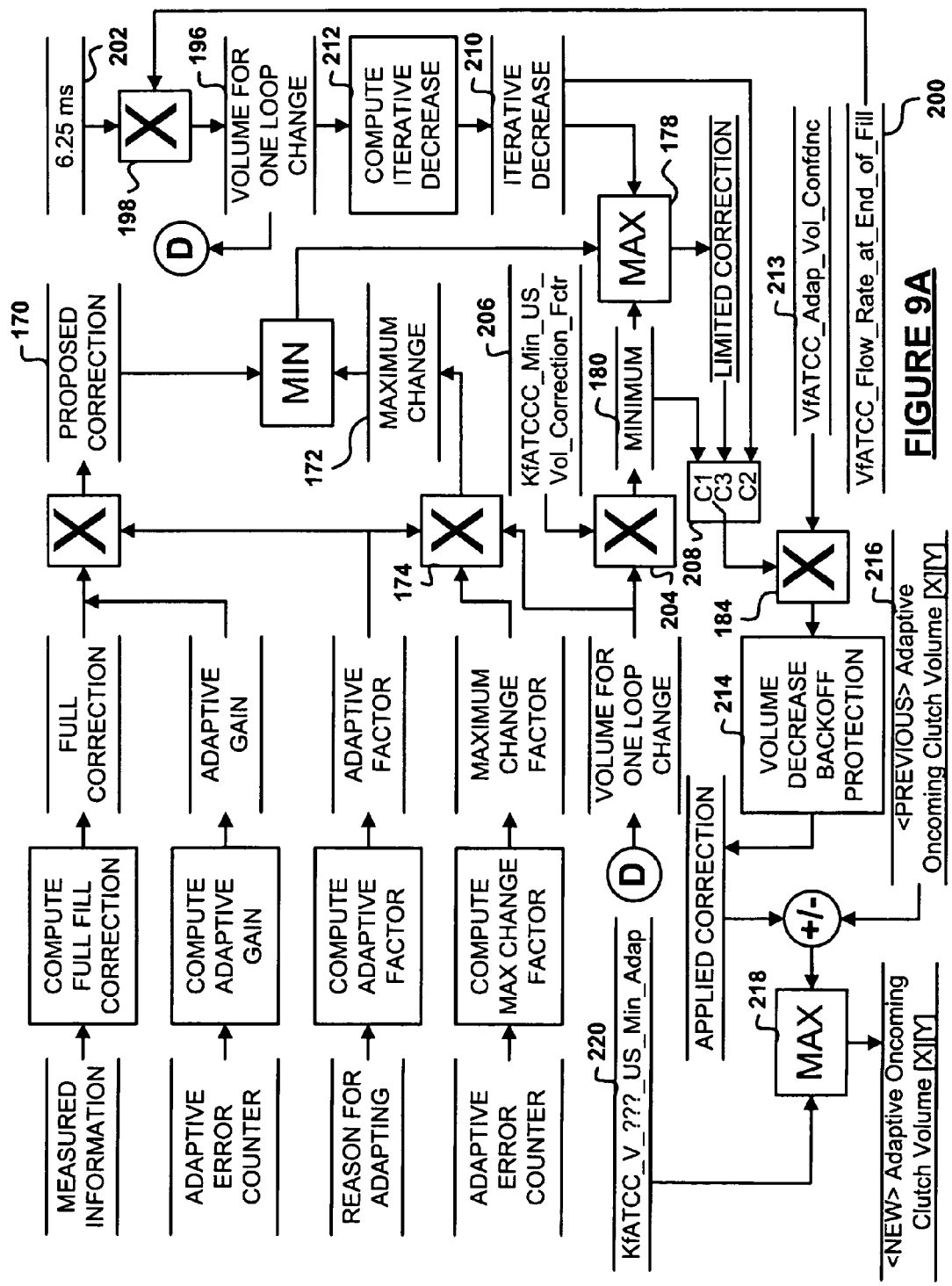

LEARNING METHOD FOR ONCOMING CLUTCH FILL LEVEL AND VOLUME

FIELD OF THE INVENTION

The present invention generally relates to electronic control of vehicle clutch systems, and more particularly to a control system and method for adapting oncoming clutch volume and fill level in a clutch to clutch transmission.

BACKGROUND OF THE INVENTION

Conventional transmission control systems use a one way clutch or mechanical diode as an offgoing element to transfer torque through a powertrain. In these systems, release is controlled through a rate of an on-coming element during a shift. System compliant devices such as accumulators, wave plates, and orifices have been employed with line pressure control for shift feel to control the rate of the oncoming element. This system has physically prevented occurrence of tie-up or flare that cause undesired output torque disturbances. This system, however, is not suitable for use in a clutch to clutch transmission.

A clutch to clutch transmission reduces hardware cost and envelope size by removing the mechanical system compliant devices and diodes. An electronic control system controls the oncoming and offgoing elements precisely to avoid flare and tie-up.

SUMMARY OF THE INVENTION

In accordance with the present invention, a method for adaptively learning clutch volumes and fill level to compensate for build tolerances and clutch wear includes increasing a fill level of a clutch during an oncoming fill phase of a clutch to clutch transmission. A state of a regulator valve of the clutch to clutch transmission is monitored during the oncoming fill phase. Fill level of the clutch is adjusted before a next shift based on whether the regulator valve switches from a regulating state to a full feed state before elapse of a valid shift time.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 9A and 9B are a flow diagram depicting update of adaptive parameters to adjust clutch volume level in accordance with the present invention.

DETAILED DESCRIPTION OF THE PREFERRED EMBODIMENTS

Figure 1:
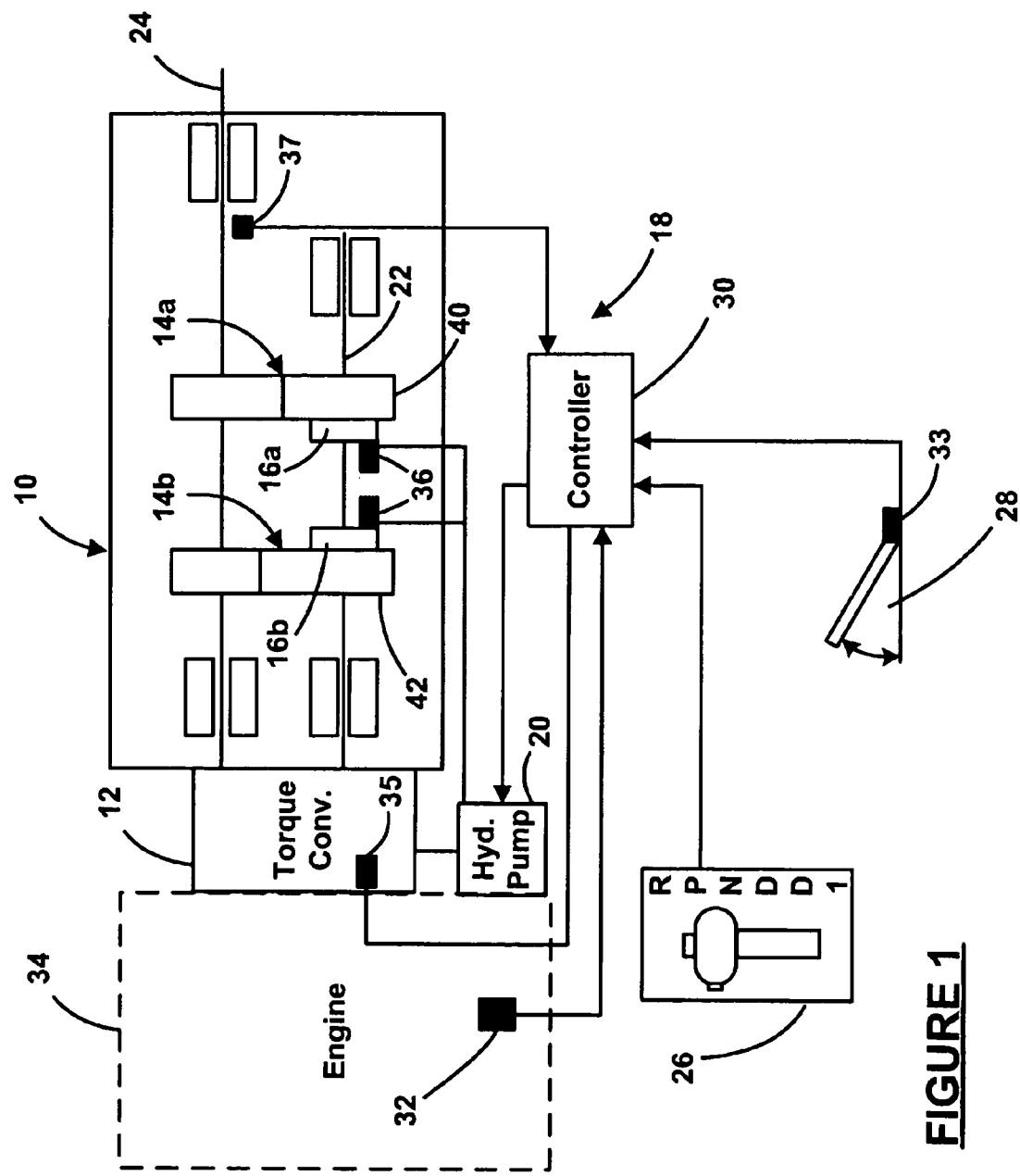
FIG. 1 is a functional block diagram of an exemplary vehicle transmission system according to the present invention.

The following description of the preferred embodiment is merely exemplary in nature and is in no way intended to limit the invention, its application, or uses. For purposes of clarity, the same reference numbers will be used in the drawings to identify similar components.

Referring now to FIG. 1, an exemplary automatic transmission 10 includes a torque converter 12, a plurality of gear sets 14a, 14b, hydraulically-actuated multiple clutches 16a, 16b, a transmission control system 18, and a hydraulic pump 20. The hydraulic pump 20 may be driven by the engine or an electric motor. The torque converter 12 enables start-off, provides torque multiplication, and absorbs harmonic vibrations within the vehicle drivetrain.

The gear sets 14a, 14b are located between an input shaft 22, which is connected to the torque converter 12, and an output shaft 24. The gear sets 14a, 14b enable the output shaft 24 to be driven at multiple gear ratios. The transmission control system 18 selectively engages the multiple clutches 16a, 16b. The hydraulic pump 20 supplies hydraulic fluid pressure for valve body and shift components and/or for the torque converter 12.

The transmission control system 18 defines gear selection and shift points and regulates demand-response shifting. Demand-response shifting is based on a shift program that is selected by the driver using a selector 26, a position of an accelerator 28, engine operating conditions, and/or vehicle speed. The transmission control system 18 is generally a combined hydraulic and electric system. The transmission control system 18 hydraulically actuates the clutches 16a, 16b. The transmission control system 18 actuates gear selection and modulates the clutch pressure electronically in accordance with the torque flowing through the transmission 10.

The transmission control system 18 includes a controller 30 that communicates with a plurality of sensors. A speed sensor 32 monitors engine speed and a position sensor 33 monitors selector-lever position. Load sensors 35 and speed sensor 37 monitor the torque converter load and the rotational speed of the output shaft 24, respectively. The controller 30 adjusts analog or digital pressure regulators 36 to control clutch pressure.

Shift-quality depends upon the accuracy that the pressure of the clutches 16a, 16b is adjusted to the level of torque transmitted. The level of torque transmitted is estimated based on engine load and output shaft speed. As the automatic transmission shifts gear ratios, one clutch gradually disengages (i.e. is off-going) as another clutch gradually engages (i.e. is on-coming). The decrease and increase of pressure of the off-going and on-coming clutches, respectively, determines the operator's feel.

Shifting between gear ratios occurs in two distinct phases: a torque phase and an inertia phase. During the torque phase, the speed of the input shaft 22 from the torque converter 12 remains constant. During the inertia phase, there is a response to the shift and the input shaft 22 changes speed. For an up-shift, the speed is decreased. For a down-shift, the speed is increased.

In operation, a first gear 40 of the first gear set 14a is initially coupled to the input shaft 22 to drive the output shaft 24 at a first gear ratio. When an up-shift is signaled by the controller 30, the clutch 16a gradually decreases engagement of the first gear 40 with the input shaft 22 (i.e. is off-going). The second clutch 16b gradually increases engagement of a second gear 42 of the second gear set 14b with the input shaft 22 (i.e. is on-coming). Eventually, the first clutch 16a completely disengages the first gear 40 from the input shaft 22 and the second clutch 16b couples the second gear 42 with the input shaft 22 to drive the output shaft 24 at a second gear ratio.

The oncoming phase for a clutch may further be divided into an oncoming fill phase and an oncoming torque phase. The present invention in part operates by detecting when the regulating valve switches to full feed. In a preferred embodiment, the present invention also detects switch from an oncoming fill phase to an oncoming torque phase by detecting when the regulator valve switches from the full feed state to the regulating state. Thus, hydraulic sensors (not shown) are provided to regulators 36 to provide feedback to controller 30. This feedback indicates whether a regulator valve is in a full feed state or a regulating state. Controller 30 preferably monitors this state during an oncoming phase of the transmission.

The oncoming fill phase occurs when the transmission is increasing fill level of the clutch and attempting to engage the gear. The regulating valve switches to a full feed state when fill pressure reaches a certain level. The oncoming torque phase occurs when the clutch obtains torque capacity greater than zero. The regulating valve switches back to a regulating state at this point so that the clutch can engage the gear at a level appropriate to the torque. The fill level of the clutch is an important adaptive parameter. It must be properly maintained to minimize return spring stroke time while achieving a regulation pressure just above the zero oncoming capacity level for reduction in tieup.

Figure 2:
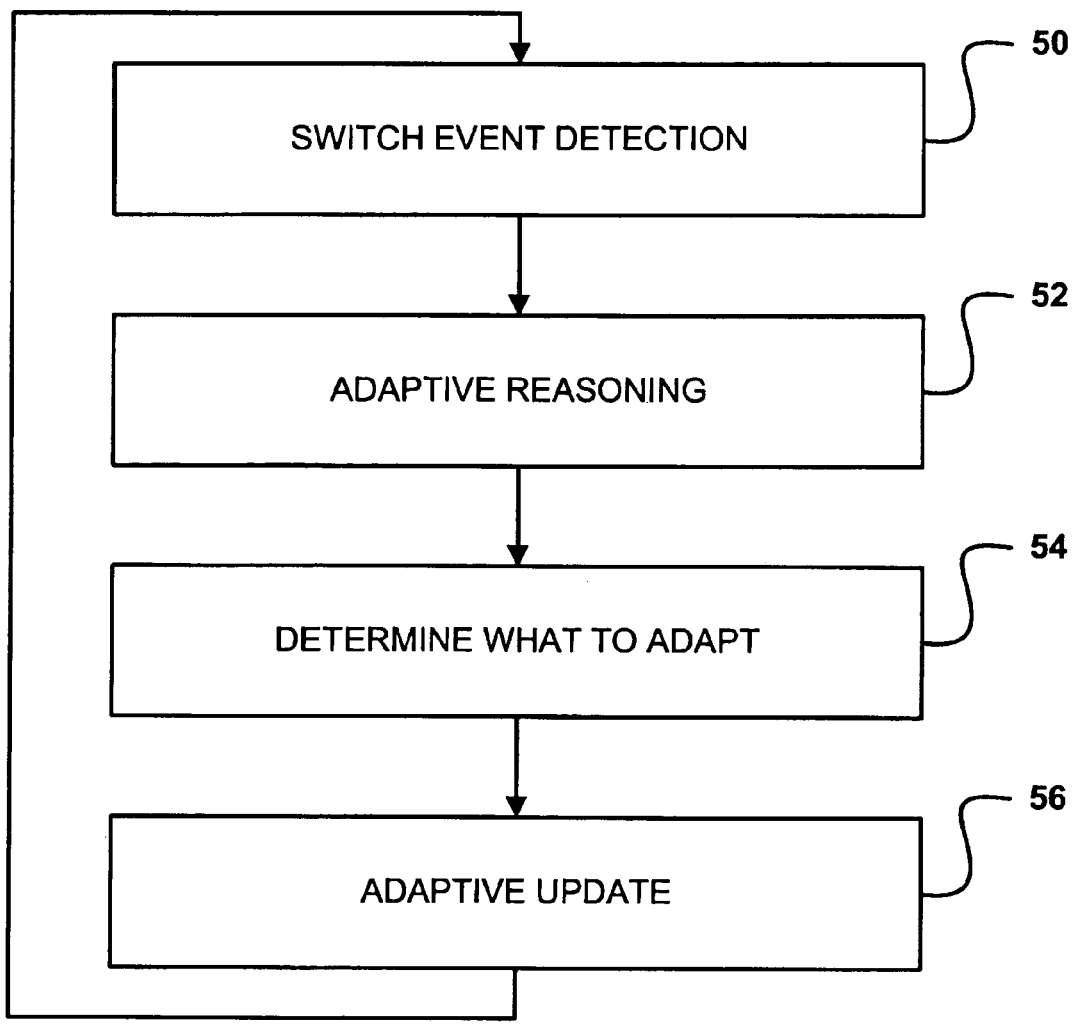
FIG. 2 is a flow diagram depicting steps of the method according to the present invention.

As illustrated in FIG. 2, the present invention performs switch event detection at step 50 to determine when a valid fill state has been achieved. It monitors switching over time of the regulator valve from a full feed state to a regulating state. It also tracks change from an oncoming fill phase to an oncoming torque phase when the regulator valve switches back to the regulating state. These sets of information are employed in step 52 to determine whether one or more reasons exist that may call for updating adaptive parameters relating to clutch fill level and clutch volume. In turn, the reasons determined in step 52 are employed in step 54 to determine what to adapt. Finally, the determinations of what to adapt are used in step 56 to update the adaptive parameters, and the reasons for the adaptation are also employed to guide and limit the update process.

Figure 3:
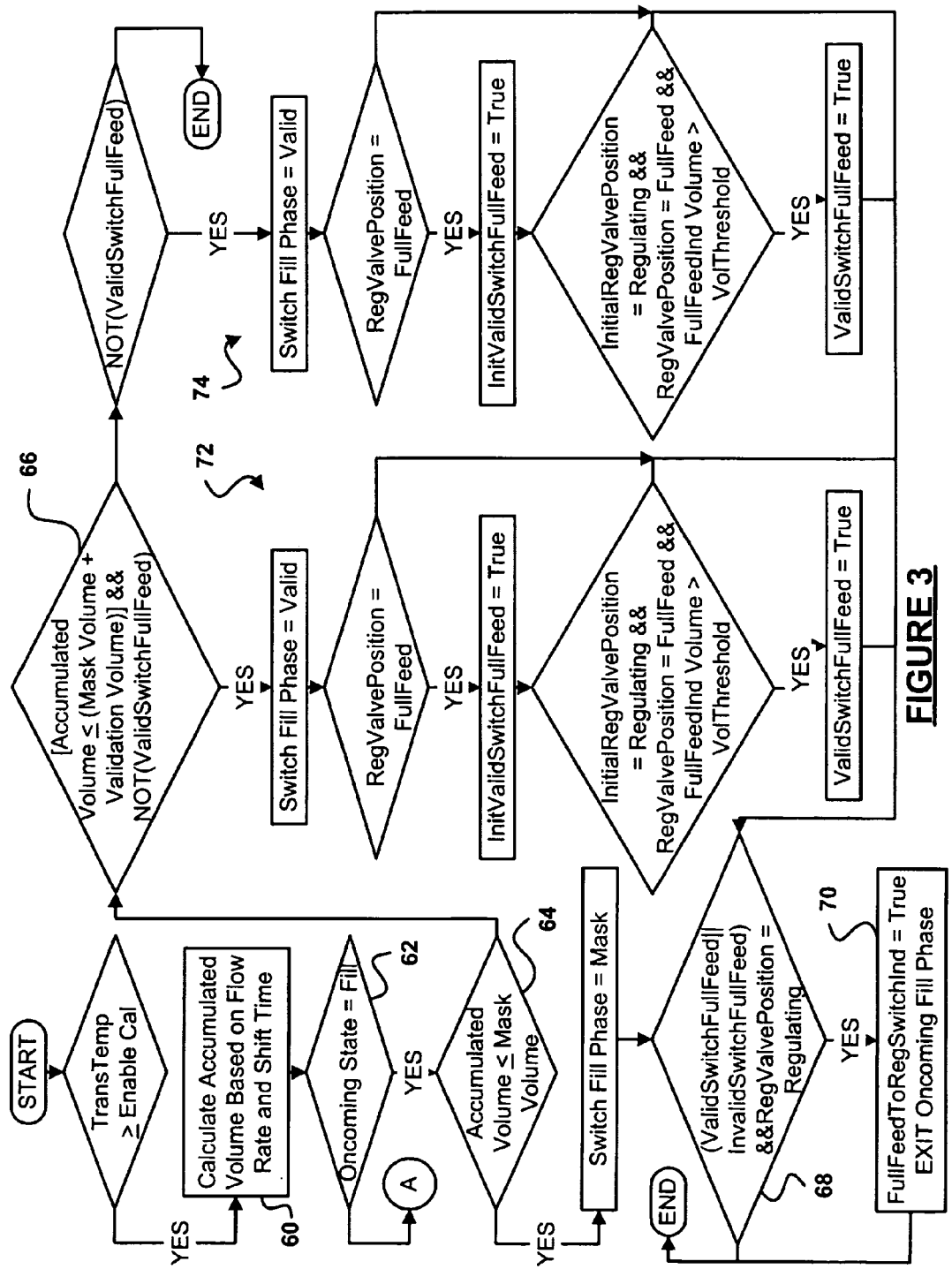
FIGS. 3 and 4 are flow diagrams depicting switch event detection in accordance with the present invention.
Figure 4:
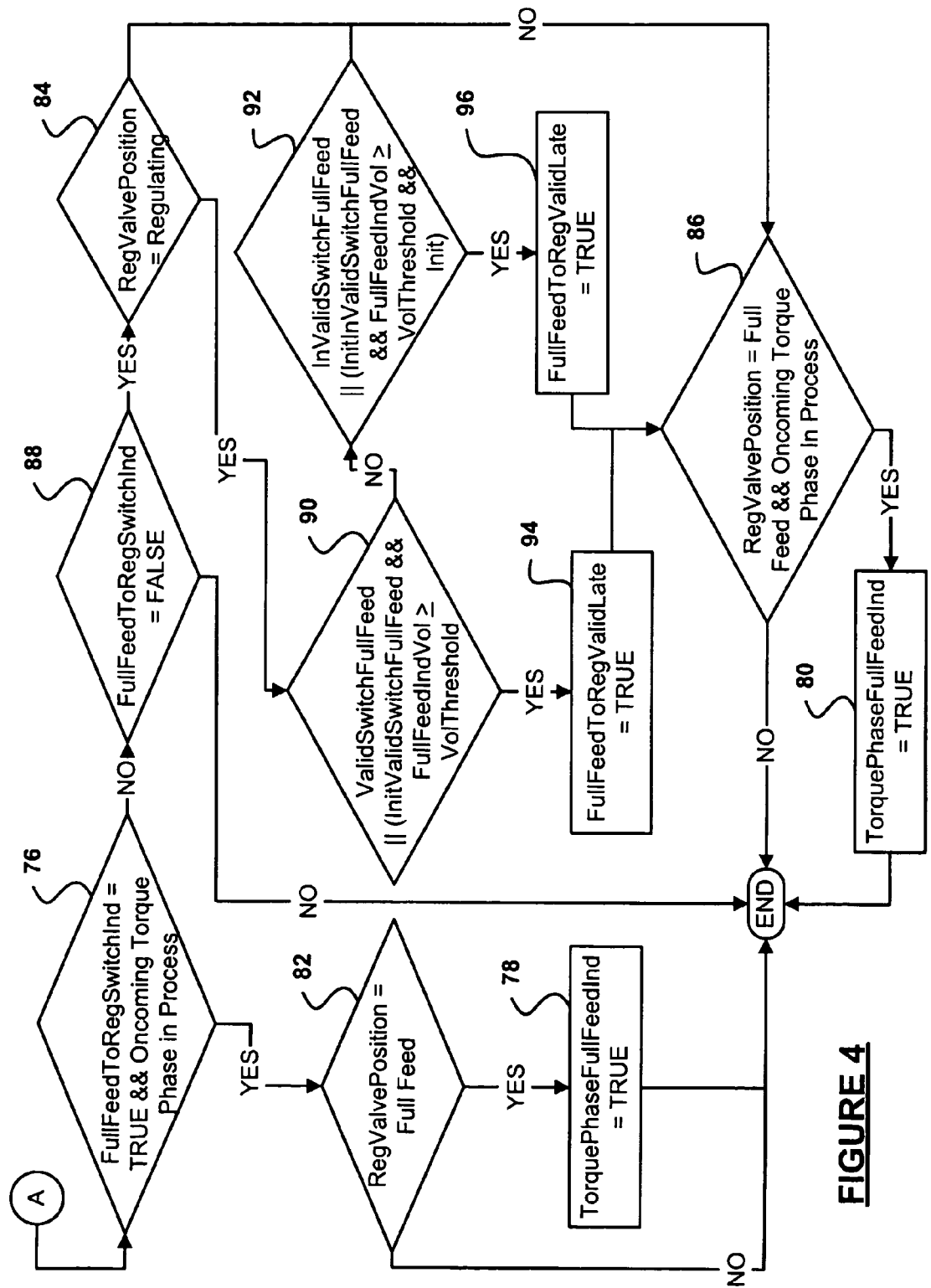

FIGS. 3 and 4 illustrate one implementation of switch event detection in accordance with step 50 (FIG. 2). For example, FIG. 4 illustrates switch event detection during, for example, an oncoming torque phase, while FIG. 3 illustrates switch event detection during an oncoming fill phase. Accordingly, accumulated clutch volume is calculated at step 60 based on a predetermined flow rate and accumulated shift time. This accumulated clutch volume is an elapsed shift time that tracks the amount of time since the beginning of an oncoming fill phase. During the oncoming fill phase as at 62, the accumulated volume is compared to a mask volume calibration as at 64 and 66. This mask volume is a temporal threshold that governs when the controller begins to monitor the state of the regulator valve during the oncoming fill phase. In part, this mask volume marks the end of a mask window during which switch to the full feed state is not detected because it did not last long enough.

The accumulate volume is also compared to a validation volume as at 66. The mask volume marks the beginning of a validation window, and the calibration volume marks the end of the validation window. During recursive loops of this switch event detection, the accumulated volume is increased until it enters the validation window and the controller begins looking at the state of the regulator valve. If the regulator valve is detected to be in a full feed state during the validation window, possibly because it entered the full feed state during the mask window, then the process begins to recursively follow branch 72.

Branch 72 records that the full feed state existed during the validity window, and further whether the full feed state existed at the start of the validity window. If the valve switches back to the regulating state after having reached full feed, then the oncoming fill phase is exited as at 68 and step 70. However, if the regulator valve does not switch back to the regulating state within the validity window, then the process begins recursively taking branch 74.

Branch 74 records that the regulator valve did not switch back to the regulating state before exiting the validity window. It also records in which state the regulator valve exited the mask window. Thus, separate validity flags are maintained by loop branches 72 and 74 to indicate three observations: whether the full feed state was noted after the beginning of the validity window, whether it was initiated before or after the beginning of the validity window, and whether a switch back to the regulating state was observed before the end of the validity window.

FIG. 4 illustrates the switch detection procedure that occurs when the transmission is not in an oncoming fill phase. For example, the process determines and records whether an oncoming torque phase is in process at 76 and steps 78 and 80. Also, the process determines and records the position of the regulator valve as at 82, 84, 86, and steps 78 and 80. Further, the process determines and records whether the regulator valve changed position from regulating to full feed during the torque phase ramp. In addition, the amount of accumulated volume during the full feed fill stage until the first instance of regulating is encountered. The result is employed at 90 and 92 to record at steps 94 and 96, whether the switch indication of full feed is long enough to allow an eventual decrease of pressure. An iteration through one path of these processes completes step 50 (FIG. 2), and the method of the present invention continues to step 52, one example of which is described below with reference to FIGS. 5 and 6.

Figure 5:
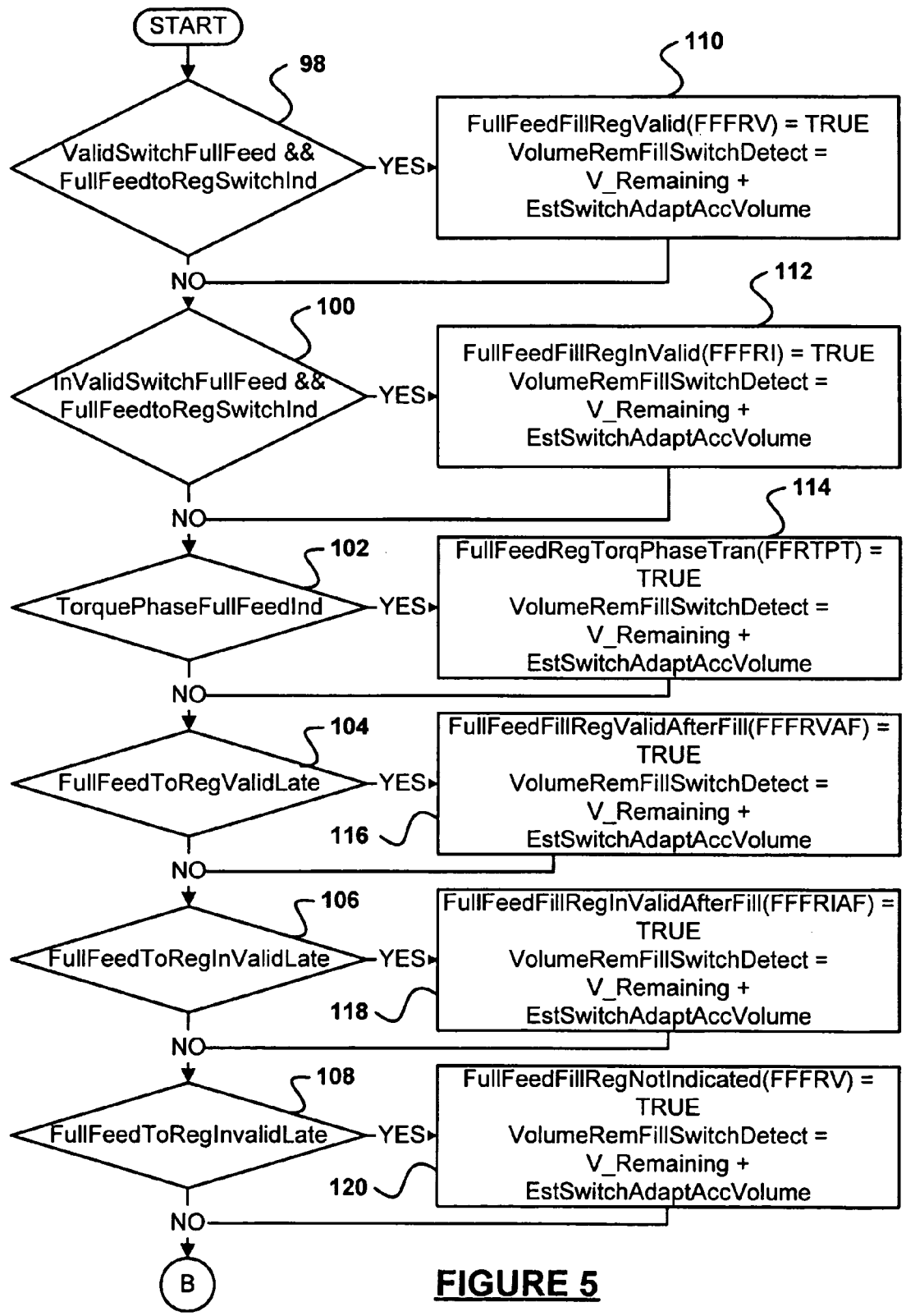
FIG. 5 is a flow diagram depicting evaluation of detected and recorded switch events to establish and record reasons for adapting clutch fill level.

FIG. 5 illustrates evaluation of detected and recorded switch events as at 98–102 to establish and record reasons for adapting clutch fill level at steps 110–120. Each of steps 110–120 records information about conditions surrounding a regulator switch event, and each of steps 110–118 further records an amount of calculated volume remaining when the switch event occurred. This information records detected-circumstances that may indicate whether and in what manner clutch fill level needs to be adjusted. Also, the amount of clutch volume remaining when these circumstances occur may be further useful in determining whether and in what manner to adjust clutch volume as explained below with reference to FIG. 6. Thus, part of the information needed for adapting clutch volume is recorded during an evaluation of reasons for adapting clutch fill level.

Figure 6:
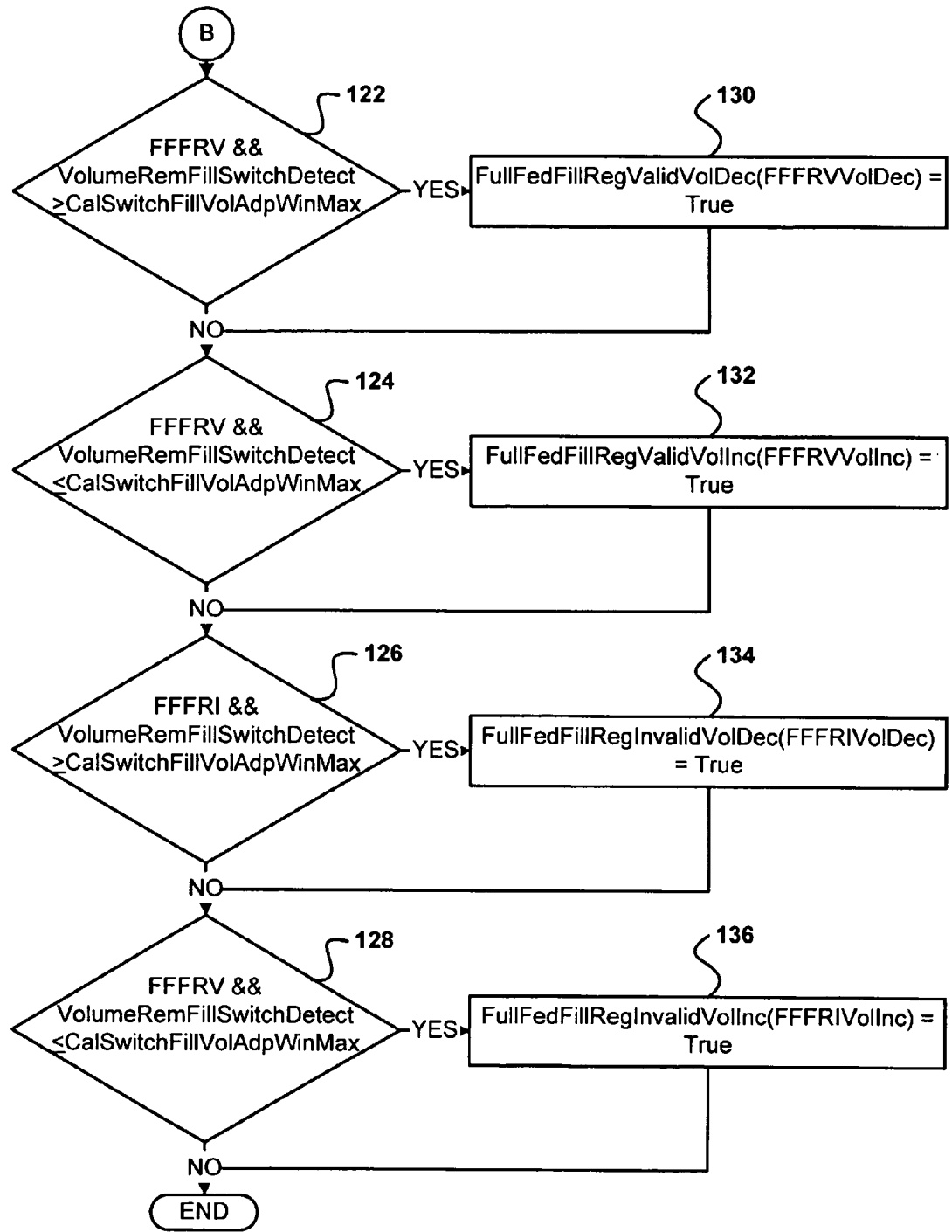
FIG. 6 is a flow diagram depicting evaluation of detected and recorded switch events to establish and record reasons for adapting estimated clutch volume.

FIG. 6 illustrates evaluation of detected and recorded switch events as at 122–128 to establish and record reasons for adapting estimated clutch volume at steps 130–134. In particular, each of determinations 122–128 compares the calculated volume remaining when the regulator valve switched to regulating from full feed to predetermined thresholds to determine whether an increase or decrease in estimated clutch volume may be needed. An estimated remaining clutch volume is determined and recorded at the point when the regulator valve switches from the full feed state to the regulating state, thus exiting the oncoming fill phase. This estimation is accomplished by counting down clutch volume over time during the shift based on a flow rate until the switch from full feed to regulating is detected. The remaining volume is then compared to high and low thresholds straddling zero volume to define a volume window. Similar procedures are employed with respect to clutch fill level as shown in FIG. 5 to determine and record whether clutch fill level should be increased or decreased. Information relating to whether engine flare occurs during a torque ramp phase may be used to justify an adjustment of fill level. Also, non-switch of the regulator valve to full feed during the oncoming fill state can be used to justify an adjustment of fill level. Further, remaining volume level can be correlated with whether a valid fill is achieved to mitigate and affect one another. An iteration through the process illustrated in FIGS. 5 and 6 completes step 52 (FIG. 2), and the method of the present invention continues with step 54, one implementation of which is illustrated in FIG. 7.

Figure 7:
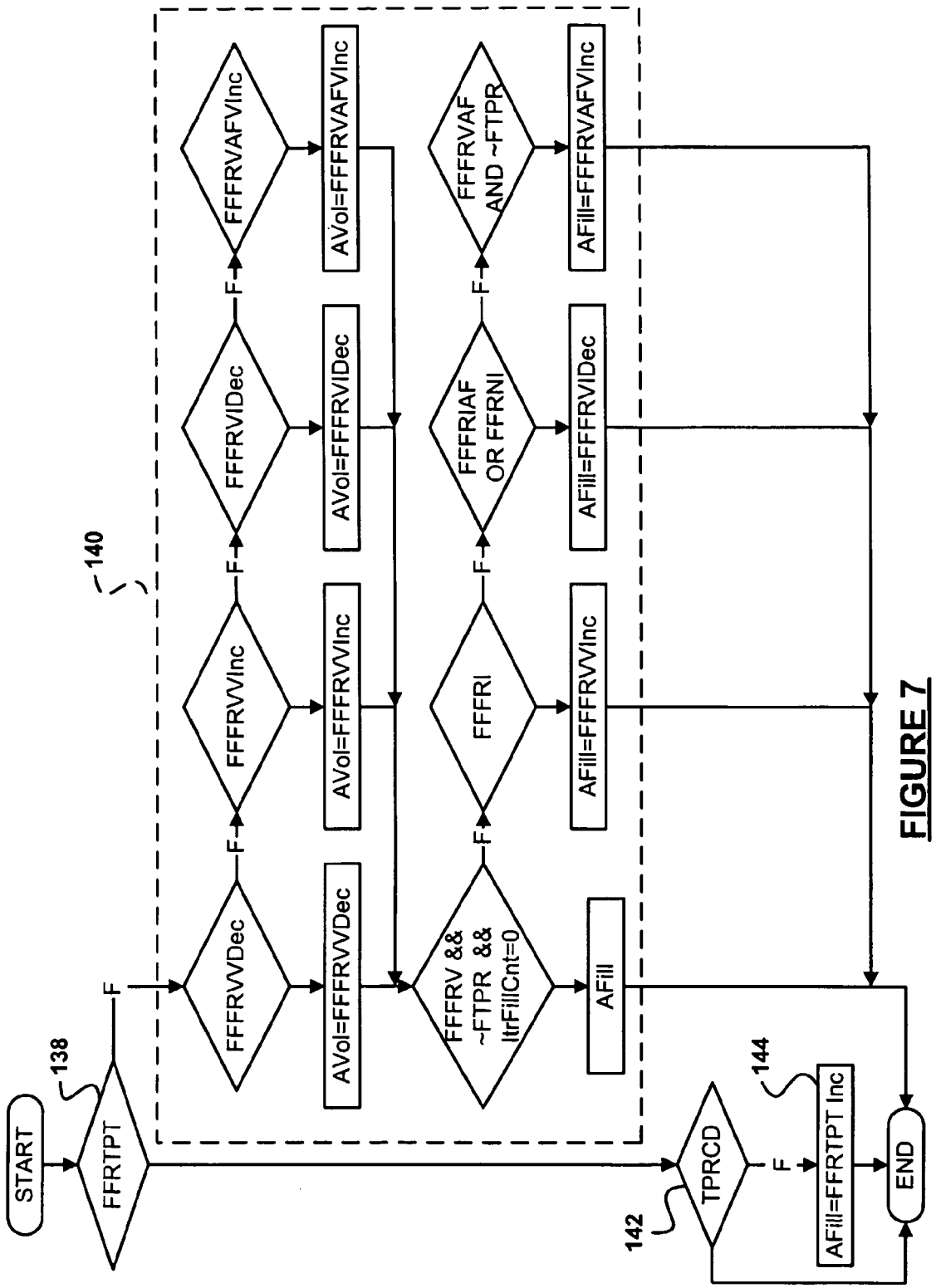
FIG. 7 is a flow diagram depicting determination of what to adapt with respect to one or more reasons for one or more adaptations in accordance with the present invention.

FIG. 7 illustrates a procedure for determining what adaptive parameters to update, and this process is facilitated in the case where it has already been determined whether to increase or decrease certain adaptive parameters as detailed above. Thus, if the transmission is not in a torque phase with the regulating valve in full feed position as at 138, then determination and recordation of whether to adapt clutch volume and/or fill level simply corresponds to checking whether the volume or fill level should be increased or decreased, regardless of the reason underlying the decision as at 140. Also, if the regulator valve enters full feed during the oncoming torque phase as at 138 and the oncoming element does not pull turbine speed down early during the torque phase ramp as at 142, then a record that fill level needs to be adjusted is made at step 144. An iteration through this process completes step 54 (FIG. 2), and the method of the present invention continues with step 56, an implementation of which is illustrated in FIGS. 8–10.

Figure 8:
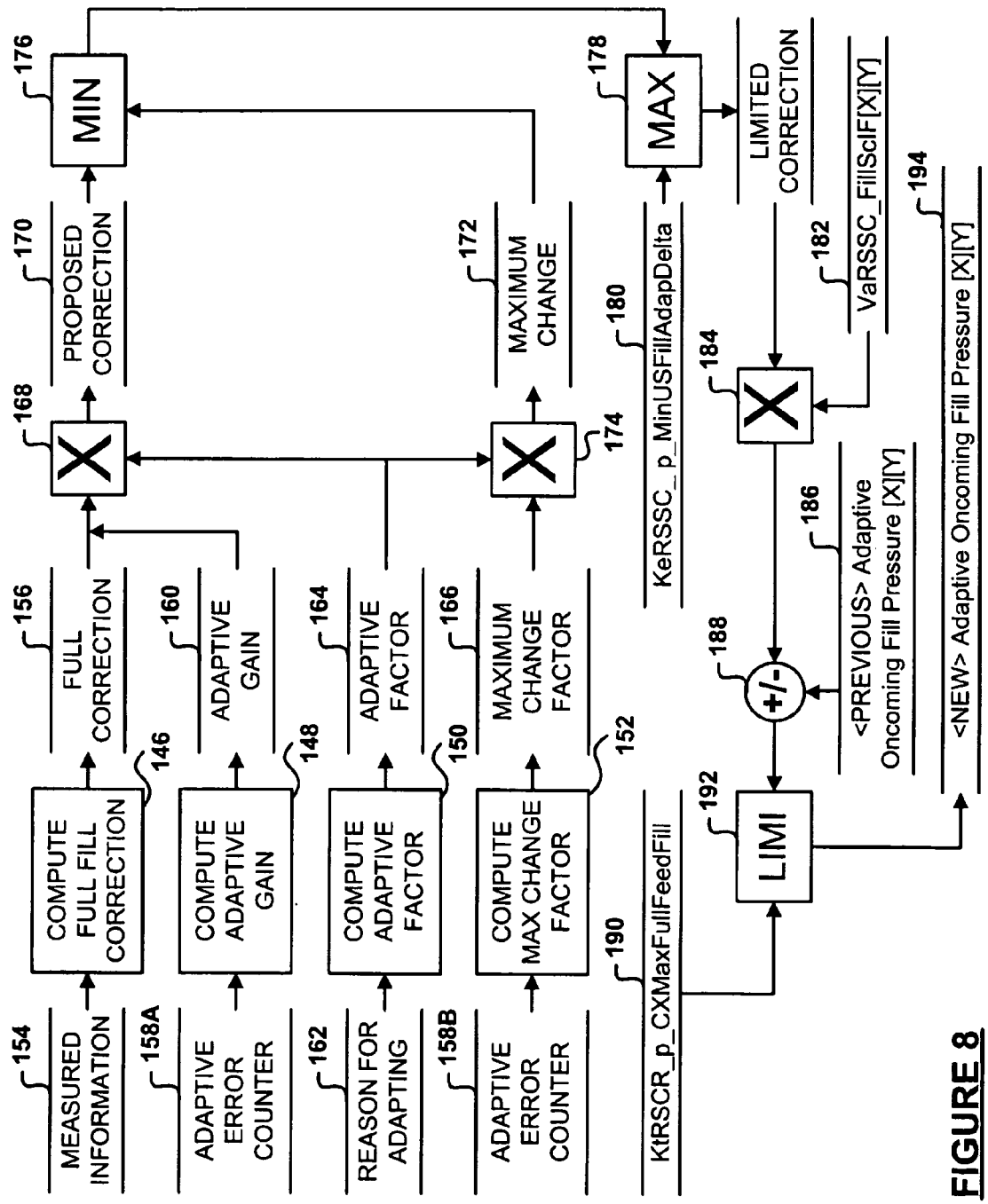
FIG. 8 is a flow diagram depicting update of adaptive parameters to increase or decrease clutch fill level before a next shift in accordance with the present invention.

FIG. 8 illustrates update of fill adaptive parameters. For example, modules 146–152 receive four types of information: measured information 154 by which to compute an adaptive parameter in the form of a full correction 156; an adaptive error counter 158A by which to calculate an adaptive gain 160 for the adaptive parameter; one or more recorded reasons 162 for adapting the parameter in question by which an adaptive factor 164 is determined, and adaptive error counter 158B by which to calculate a maximum change factor 166. Adaptive gain 160 and adaptive factor 164 are applied to full correction 156 at 168 to obtain a proposed correction 170. Adaptive factor 164 is also used with maximum change factor 166 to produce maximum change 172 at 174. Proposed correction 170 is limited in turn at 176 and 178 based on maximum change 172 and minimum change 180. A five by five place calibration for each fill adaptive cell is applied at 184 to determine adaptive weighting. The fill adaptive parameter is a function of line pressure command and temperature, and this process is run for all cells in a three by three adaptive matrix. Thus, the weighted and limited adaptive parameter is applied to a previous adaptive parameter for fill level 186 at 188. Whether the application at 188 results in an increase or decrease is governed by recordation of adaptive reasoning as previously discussed. A maximum fill level 190 is further applied at 192 to obtain a new adaptive parameter for fill level 194.

Figure 9B:
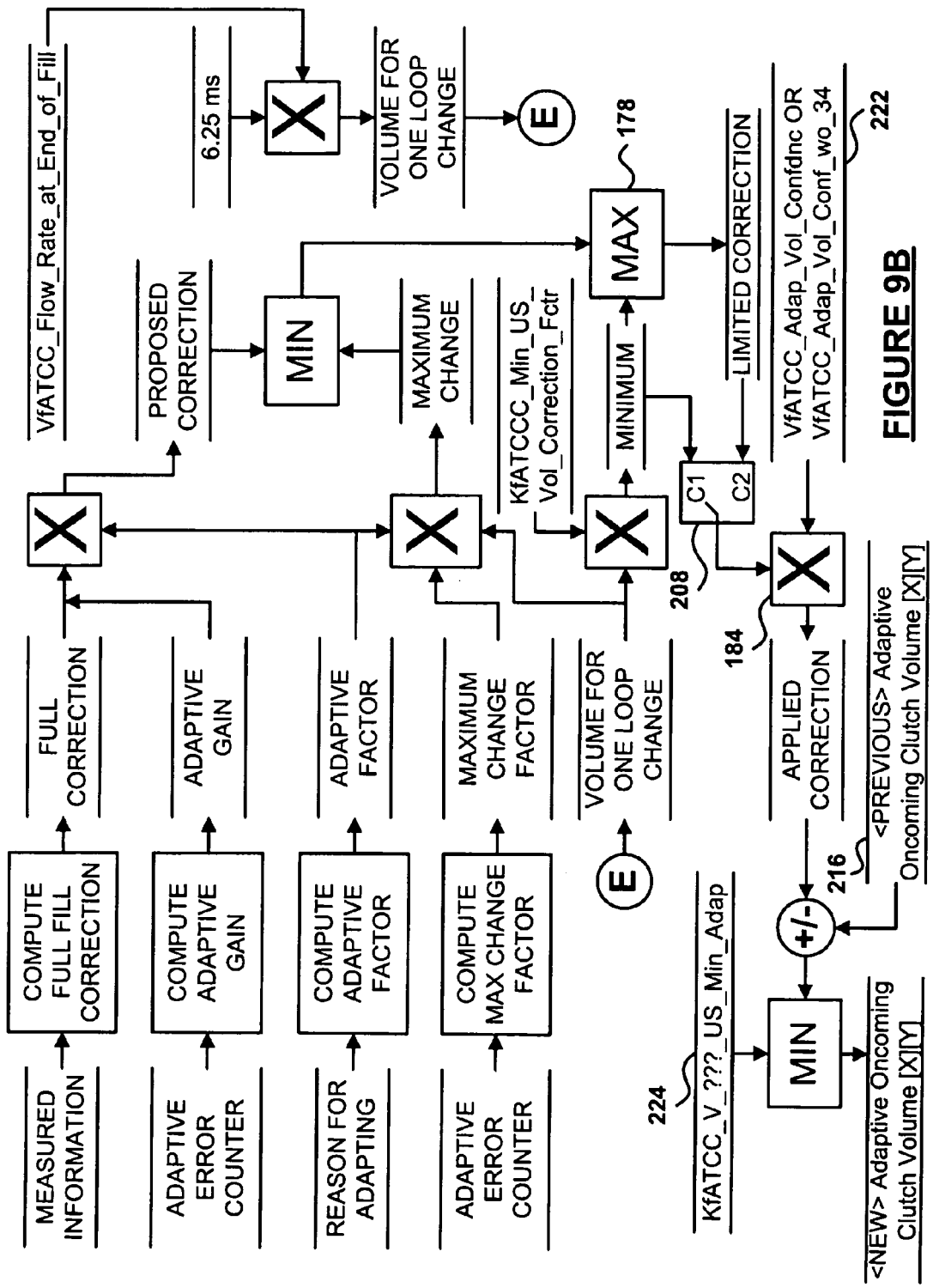

FIG. 9 illustrates a similar process for updating clutch volume adaptive parameters, but with some alternative procedures for limiting the adaptation. For example, maximum change 172 is determined at 174 based on a volume for a one loop change 196, which is determined at 198 as a function of flow rate 200 over an iteration time 202. Also, this volume for a one loop change 196 is further combined at 204 with a minimum volume correction factor 206 to arrive at minimum change 180. The minimum change 180 is still employed at 178 to limit proposed correction 170, but is also communicated to conditional control block 208, which selects between the output of block 178 and minimum change 180 based on criteria relating to whether a current torque level is within a predetermined range, and whether a valid fill has been achieved. Control block 208 is also adapted to select an iterative decrease 210 computed by block 212 based on volume for a one loop change 196. Iterative decrease 196 is further employed at 178 to limit proposed correction 170. The output of block 208 has a confidence value 213 applied at 184 to obtain volume decrease backoff protection 214. The correction is then applied to a previous adaptive volume parameter 216 to decrease the parameter 216, and the change in the parameter is limited at 218 according to a minimum adaptation limit 220.

FIG. 10 illustrates the process of FIG. 9 adapted for increase of the volume. For example, an iterative decrease is not required at 78 or block 208, and no backoff protection is needed. Also, multiple confidence values 222 are employed at 184. Further, parameter 216 is increased as a result of the update, and limited according to a maximum adaptation limit 224.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for adaptively learning clutch volumes and fill level to compensate for build tolerances and clutch wear, comprising:
   increasing a fill level of a clutch during an oncoming fill phase of a clutch to clutch transmission;
   monitoring a state of a regulator valve of the clutch to clutch transmission during the oncoming fill phase; and
   adjusting fill level of the clutch before a next shift based on whether the regulator valve switches from a regulating state to a full feed state before elapse of a valid shift time.

2. The method of claim 1 further comprising adjusting clutch volume before the next shift based on whether an estimated amount of clutch volume remaining falls within a predetermined volume window when the regulator valve switches from the full feed state to the regulating state.

3. The method of claim 2 further comprising:
   determining whether flare is present during a torque phase ramp of the transmission; and determining whether to adjust at least one of clutch volume and clutch fill level based on whether flare is present during the torque phase ramp.

4. The method of claim 2 further comprising:
determining whether an oncoming element of the transmission pulls turbine speed down early during a torque phase ramp of the transmission; and
determining whether to adjust at least one of clutch volume and clutch fill level based on whether the oncoming element pulls turbine speed down early during the torque phase ramp.

5. The method of claim 2 further comprising:
determining that the regulator valve switches to the full feed state from the regulating state after elapse of the valid switch time, thereby detecting an invalid fill;
determining that the regulator valve switches to the regulating state from the full feed state after an amount of clutch volume remaining falls below a lower limit of the volume window, thereby detecting a late invalid fill; and
increasing fill level based on detection of the late invalid fill.

6. The method of claim 2 further comprising:
determining at least one of:
(a) that the regulator valve does not switch from the regulating state to the full feed state during the oncoming fill phase, thereby detecting a non-switch of the regulator valve, and
(b) that the regulator valve does not maintain the full feed state for a period of time exceeding a predetermined threshold, thereby detecting a non-switch of the regulator valve; and
increasing fill level based on detection of the non-switch of the regulator valve.

7. The method of claim 2 further comprising increasing clutch volume based on the estimated amount of clutch volume remaining falling below a lower limit of the volume window when the regulator valve switches from the full feed state to the regulating state.

8. The method of claim 2 further comprising decreasing clutch volume based on the estimated amount of clutch volume remaining exceeding an upper limit of the volume window when the regulator valve switches from the full feed state to the regulating state.

9. The method of claim 1 further comprising:
monitoring the state of the regulator valve of the clutch to clutch transmission during an oncoming torque phase of the transmission;
detecting a switch of the regulator valve to the full feed state during the oncoming torque phase;
determining whether an oncoming element of the transmission pulls turbine speed down early during a torque phase ramp of the transmission; and
adjusting fill level of the clutch based on detection of switch the regulator valve to the full feed state during the oncoming torque phase without the oncoming element of the transmission pulling turbine speed down early during the torque phase ramp.

10. The method of claim 1 further comprising decreasing fill level of the clutch based on switch of the regulating valve from the regulating state to the full feed state before elapse of the valid shift time.

11. The method of claim 1 further comprising increasing fill level of the clutch based on elapse of the valid shift time before switch of the regulating valve from the regulating state to the full feed state.

12. The method of claim 1 further comprising:
calculating accumulated volume of the clutch during the oncoming fill state based on a flow rate and an elapsed shift time; and
declining to monitor the regulator valve until the accumulated volume rises above a predetermined level.

13. A system for adaptively learning clutch volumes and fill level to compensate for build tolerances and clutch wear, comprising:
a control module that increases a fill level of a clutch during an oncoming fill phase of a clutch to clutch transmission;
an input receptive of a signal from a sensor monitoring a state of a regulator valve of the clutch to clutch transmission during the oncoming fill phase; and
a learning module that adjusts fill level adaptive parameters of the clutch before a next shift based on whether the regulator valve switches from a regulating state to a full feed state before elapse of a valid shift time.

14. The system of claim 13 wherein said learning module adjusts clutch volume adaptive parameters before the next shift based on whether an estimated amount of clutch volume remaining falls within a predetermined volume window when the regulator valve switches from the full feed state to the regulating state.

15. The system of claim 14 wherein said learning module adjusts at least one of clutch fill level adaptive parameters and clutch volume adaptive parameters based on whether flare is present during a torque phase ramp of the transmission.

16. The system of claim 14 wherein said learning module adjusts at least one of clutch fill level adaptive parameters and clutch volume adaptive parameters based on whether an oncoming element of the transmission pulls turbine speed down early during a torque phase ramp of the transmission.

17. The system of claim 14 wherein said learning module adjusts at least one of clutch fill level adaptive parameters and clutch volume adaptive parameters based on said regulator valve not switching to the full feed state during the oncoming fill phase.

18. The system of claim 14 wherein said input is further receptive of the signal during an oncoming torque phase of the transmission, and said learning module is adapted to adjust at least one of clutch fill level adaptive parameters and clutch volume adaptive parameters based on whether the regulator valve switches to the full feed state during the oncoming torque phase.

19. The system of claim 14 wherein said learning module adjusts at least one of clutch fill level adaptive parameters and clutch volume adaptive parameters based on whether an oncoming element of the transmission pulls turbine speed down early during a torque phase ramp of the transmission.

20. The system of claim 13 wherein said learning module calculates accumulated volume of the clutch during the oncoming fill state based on a flow rate and an elapsed shift time, and ignores the signal from said input until the accumulated volume rises above a predetermined level.

* * * * *